United States Patent [19]
Monaghan et al.

[11] 3,731,489
[45] May 8, 1973

[54] THRUST DEFLECTOR FOR A GAS TURBINE ENGINE

[75] Inventors: William Thomas Monaghan, Sandiacre; Leonard John Rodgers, Spondon, both of England

[73] Assignee: Rolls-Royce Limited, Derby, England

[22] Filed: May 20, 1971

[21] Appl. No.: 145,395

[30] Foreign Application Priority Data

May 22, 1970 Great Britain......................24,833/70

[52] U.S. Cl................60/226 A, 60/230, 239/265.19
[51] Int. Cl................................................F02k 3/06
[58] Field of Search....................60/230, 232, 226 A; 239/265.19, 265.23, 265.27, 265.37, 265.39, 265.33

[56] References Cited

UNITED STATES PATENTS

| 3,262,645 | 7/1966 | Veno | 239/265.19 |
| 2,734,698 | 2/1956 | Straayer | 60/232 |
| 3,112,616 | 12/1963 | Adamson et al. | 239/265.27 |

Primary Examiner—Carlton R. Croyle
Assistant Examiner—Robert E. Garrett
Attorney—Cushman, Darby & Cushman

[57] ABSTRACT

Vectorable engines for aircraft have thrust deflecting apparatus which tends to lose efficiency by causing one portion of the gas efflux to partially cancel the deflecting effect of the apparatus on the remainder of the gas efflux. Thus the present invention deflects half of the gas efflux away from the remainder and that efflux not deflected tends to assist the provision of thrust in the desired direction, by virtue of its natural flowpath.

4 Claims, 6 Drawing Figures

Patented May 8, 1973

INVENTORS
WILLIAM THOMAS MONAGHAN
LEONARD JOHN RODGERS
By Cushman, Darby & Cushman
ATTORNEYS Patented May 8, 1973  3,731,489

INVENTORS
WILLIAM THOMAS MONAGHAN
BY LEONARD JOHN RODGERS
Cushman, Darby & Cushman
ATTORNEYS Patented May 8, 1973

THRUST DEFLECTOR FOR A GAS TURBINE ENGINE

Fluid flow engines of the gas turbine and gas turbine ducted fan type having thrust deflecting apparatus mounted externally thereof, for the purpose of selectively deflecting a portion of the efflux from the engine are well known in the art. However these deflectors all have a common disadvantage in that efflux is deflected across its normal path, which is axially of the engine, and thus partly defeats its own objective which is to provide a thrust in a direction other than axially of the engine so as to change the direction of movement of the object e.g. an aircraft, to which the engine is attached. Deflected efflux passes across the axial efflux path and is thus deflected at least part of the way back to its original path and so efficiency is lost. At the same time, axially travelling efflux is slightly deflected by the deliberately deflected efflux, thus the efficiency of the thrust from this efflux is lost.

It is an object of this invention to provide a thrust deflector which obviates the dual deflection with its attendant efficiency losses.

Accordingly the present invention comprises a fluid flow engine having thrust deflecting means mounted at or adjacent its downstream end, the thrust deflecting means comprising a framework of guide vanes adapted for movement from an inoperative position out of the efflux to an operative position in the efflux and wherein the guide vanes deflect a portion only of the efflux in a direction outwardly of the engine axis, the remainder of the efflux being undeflected thereby.

The invention will now be described, by way of example only, with reference to the accompanying drawings in which.

Figure 1:
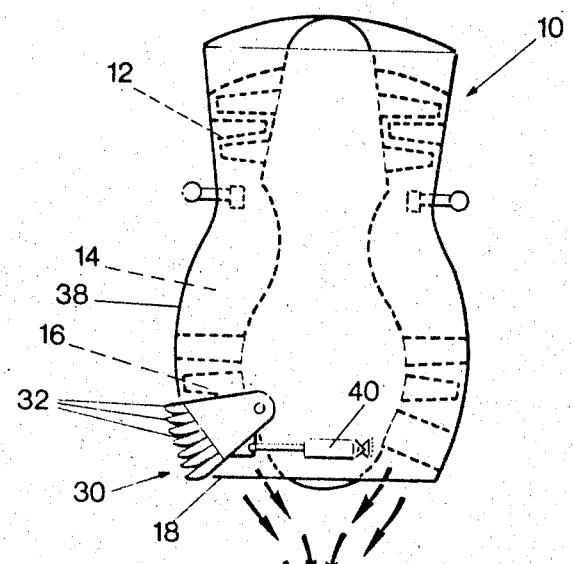
FIG. 1 is a view of a gas turbine engine provided with one embodiment of the invention.

In FIG. 1 a gas turbine engine is indicated generally by the numeral 10.

Figure 3:
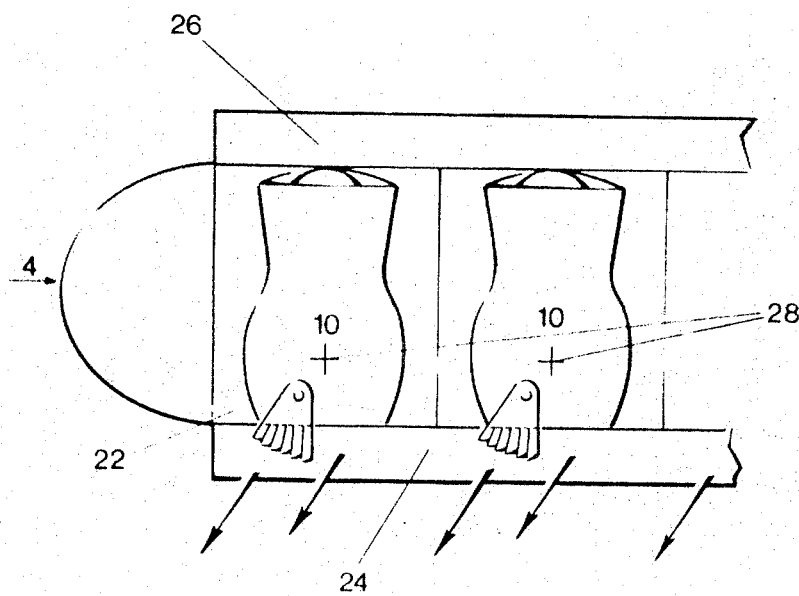
FIG. 3 is a further view of an engine in accordance with FIG. 1 installed in an aircraft wing pod.
Figure 4:
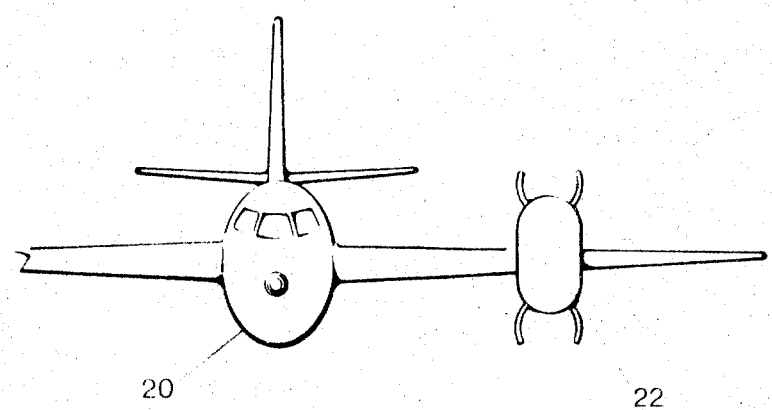
FIG. 4 is a view in the direction of arrow 4 in FIG. 3.

The engine comprises a compressor 12, combustion portion 14, an expansion turbine 16 and an exhaust nozzle 18. Moreover, as shown, the engine is suitable for mounting in some part of the structure of an aircraft 20 so as to provide a downwardly directed thrust to assist in Vertical take off and landing thereof, as is known in the art. For example FIG. 3 shows a plurality of engines 10 mounted in a wing pod 22 which has doors 24 and 26 which are openable for the respective ingress and egress of air and exhaust gases by the engines 10. The engines 10 are mounted with their axes vertical so as to provide the desired vertical thrust.

Engines 10 may also be mounted on axes 28 which are transverse to the pod longitudinal axis and thus the engines could be tiltable to give a degree of vectored thrust as is known in the art. Means would be required to tilt the engines but these are not shown.

Figure 2:
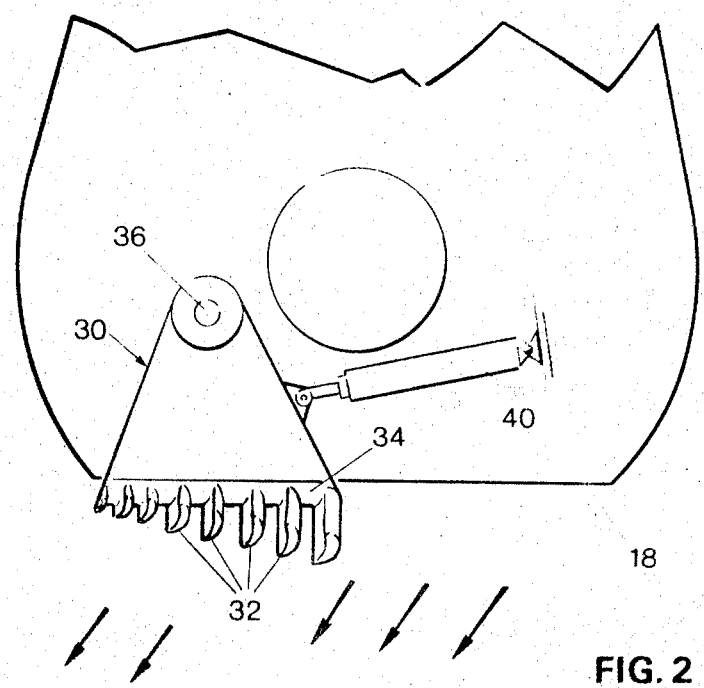
FIG. 2 is an enlarged part view of FIG. 1.

In order to obtain further vectoring of the thrust, a cowl member 30 is fitted on one side of each engine adjacent the exhaust nozzle 18. The cowl comprises a plurality of guide vanes 32 which are best seen in FIG. 2, the vanes being held in spaced apart relationship with each other by a framework 34. The cowl member 30 is pivotally mounted at 36 either to the outer casing 38 of engine 10 or to fixed structure forming part of the bay or nacelle in which the engine itself is mounted. In the present example the mounting 36 is on the outer casing 38 of engine 10.

Cowl member 30 is shaped so that when in an inoperative position as seen in FIG. 1, it fits closely to the outer casing 38 and when in an operative position as seen in FIG. 3 it lies in the path of approximately one half of the gas efflux from engine 10. Movement to and from the operative position is obtained by actuation of ram 40 which at one end is connected to fixed structure and at the other end, to cowl member 30.

Guide vanes 32 are curved so as to deflect efflux away from the engine axis when cowl member 30 is in the operative position, thus the maximum thrust possible under thrust deflection conditions is attained by virtue of maintaining deflected efflux separate from non-deflected efflux. In the specific embodiment of the invention as described with reference to FIGS. 1 to 4, the effect of the deflected thrust is enhanced because the exhaust nozzle of the engine 10 has a pronounced radially inwardly directed efflux path; consequently the efflux which exhausts from that part of the nozzle diametrically opposite to the cowl member 30, is exhausting in a direction across the engine axis, thus positively adding to the deflected thrust effect.

Thrust deflection as described herein can be utilized to give assistance to the wings of an aircraft for the lifting or lowering of an aircraft so as to give the aircraft short take off and landing capability.

Figure 5:
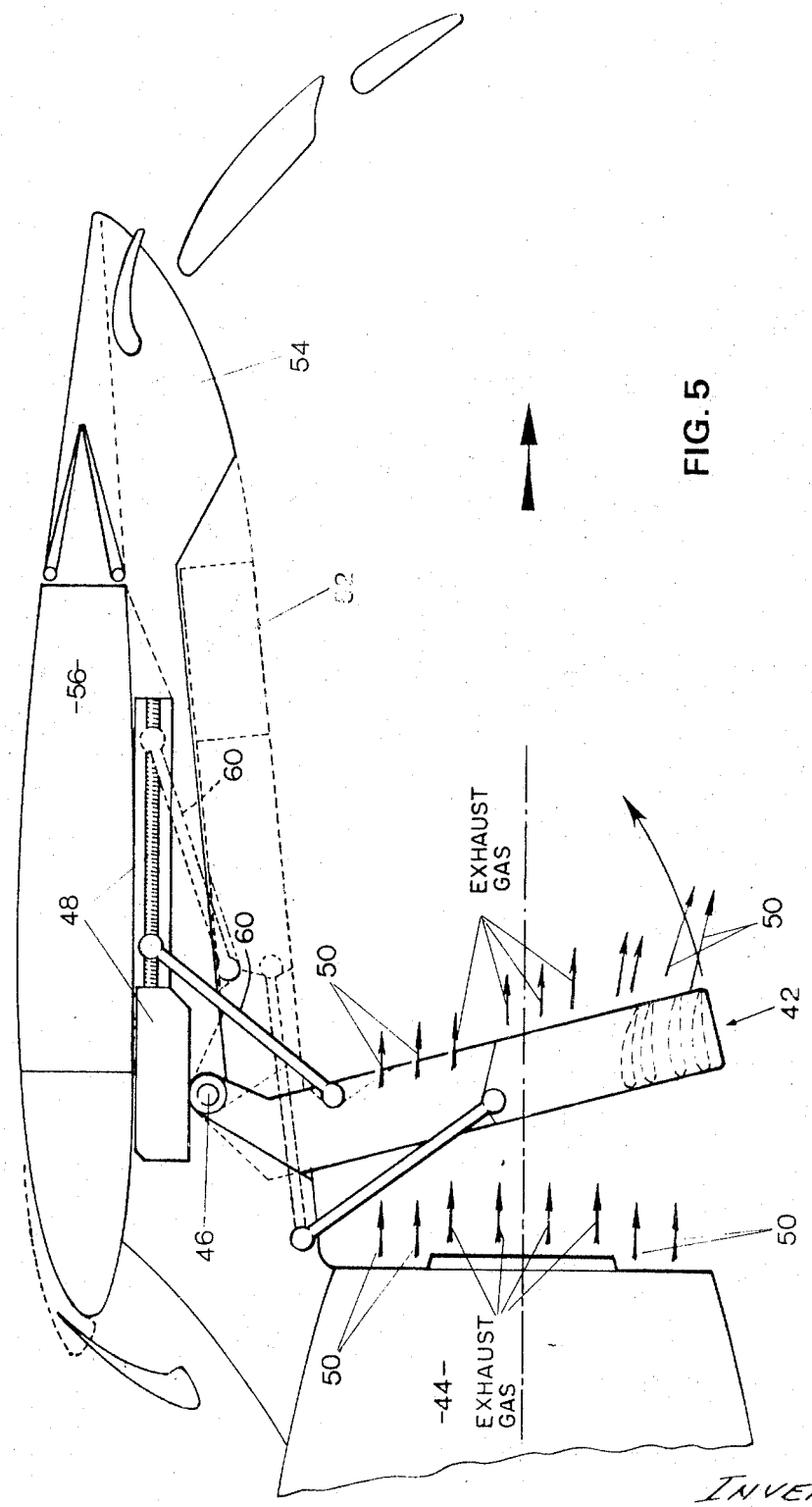
FIG. 5 is a view of a further embodiment in accordance with the invention.
Figure 6:
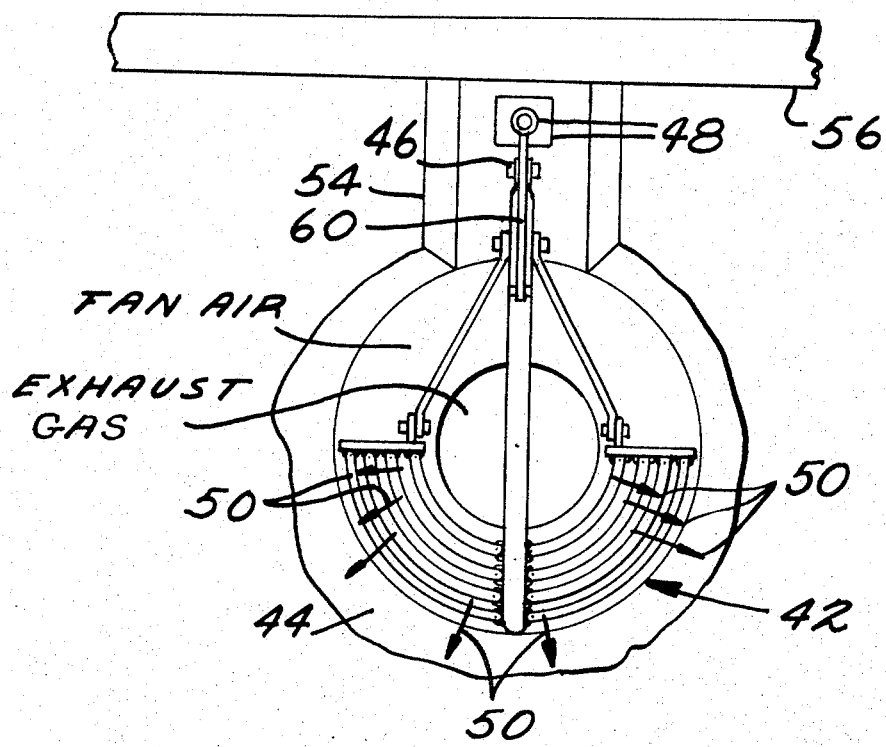
FIG. 6 is a view looking from the right to the left of FIG. 5.

FIGS. 5 and 6 disclose a further embodiment of the present invention utilized in a situation where the engine is mounted generally horizontally beneath a wing. In more detail, the engine 44 is a gas turbine ducted fan engine of the type wherein the efflux includes exhaust gases surrounded by fan air. The gas turbine ducted fan engine 44 is mounted generally horizontally on a pylon 54 which depends beneath and forward of a wing structure 56. Since it is desirable to deflect only one-half of the fan air efflux with none of the exhaust gases being deflected a framework of guide vanes 42 is provided with each of the guide vanes being semi-circular in shape so as to avoid the hot exhaust gas efflux completely.

The framework of guide vanes 42 is pivotally mounted at 46 adjacent the downstream end of the engine 44, the framework of guide vanes being movable from an inoperative position (shown in broken lines) where it is out of line of the efflux of both the fan air and exhaust gas to an operative position (shown in full lines). The arrows 50 represent the fan air and it will be noted that when the framework of guide vanes 42 is moved to the operative position it does not deflect the exhaust gases or the upper half of the fan air. The ball screw and nut mechanism generally shown at 48 is utilized to retract and extend the framework of guide vanes 42, the framework be pivoted by the link 60 and stowed in a bay 52 in the pylon 54 which extends downwardly and forwardly from the wing structure 56. Of course, the bay 52 could be positioned in the wing structure 56 if so desired.

We claim:

1. In a power plant, the combination comprising: a fluid flow engine having an exhaust nozzle at its downstream end for discharging an efflux, and thrust deflecting means comprising a framework of guide vanes pivotally mounted adjacent the downstream end of said engine, means to move said framework of vanes between an inoperative position in which said vanes are completely out of said efflux and an operative position in which said vanes are moved into a portion of said efflux, said vanes being arranged to deflect the portion of said efflux outwardly away from the longitudinal axis of said engine and from a remainder of the efflux, the remainder of the efflux being undeflected by the deflected portion of the efflux.

2. A power plant as claimed in claim 1 in which said vanes are bent to deflect the efflux outwardly away from the longitudinal axis of the engine.

3. A power plant as claimed in claim 1 in which said vanes deflect approximately one-half of said efflux.

4. A power plant as claimed in claim 1 in which said fluid flow engine is a gas turbine ducted fan engine and in which the efflux from the gas turbine ducted fan engine is exhaust air and exhaust gases and in which said guide vanes are arranged to deflect only a portion of the exhaust air.

* * * * *